E. R. BELVEL.
TRUCK ATTACHMENT FOR AUTOMOBILES.
APPLICATION FILED FEB. 23, 1917.

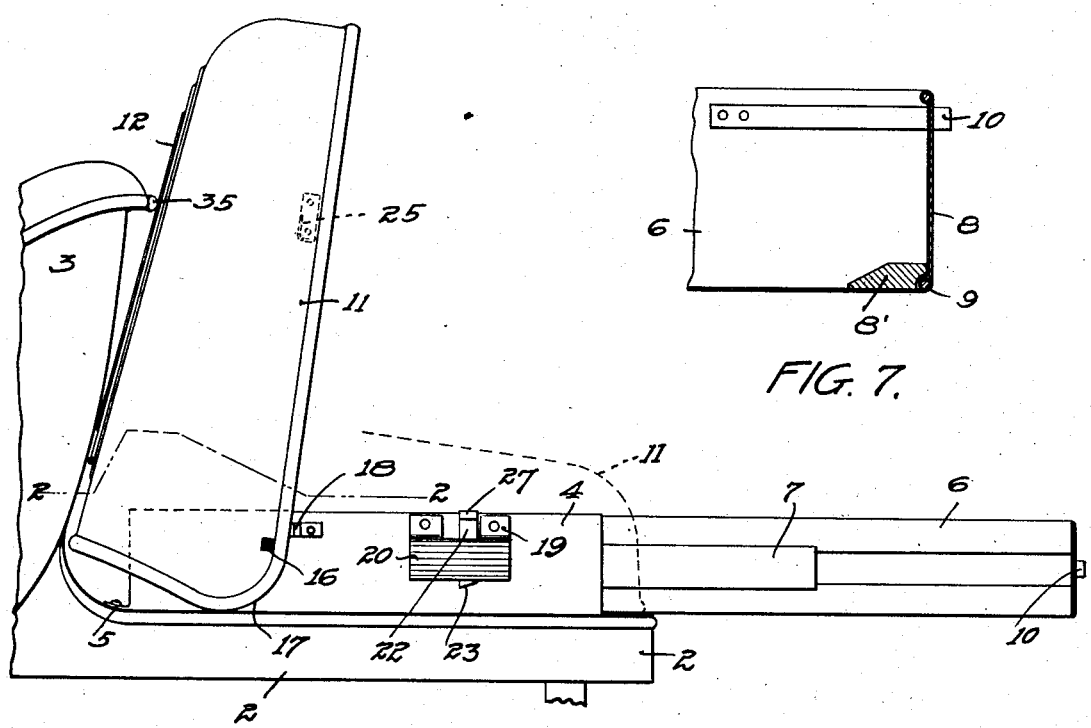
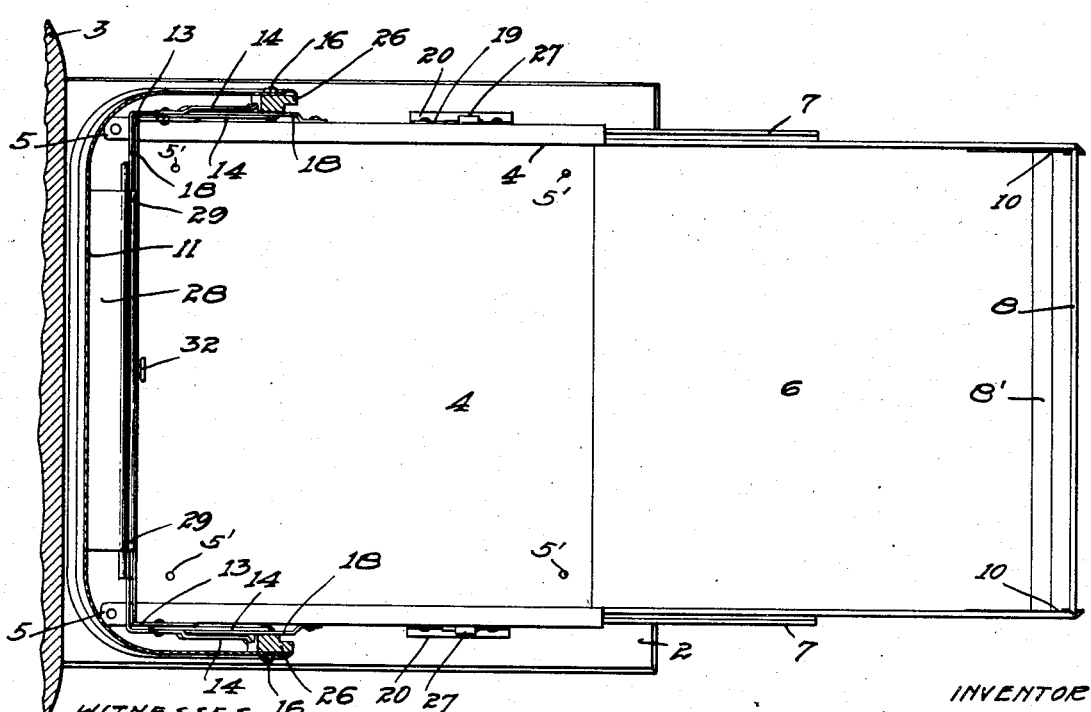

1,279,635.

Patented Sept. 24, 1918.

WITNESSES
M. R. McInnis
E. A. Paul

INVENTOR
ELIJAH REA BELVEL
BY Paul & Paul
ATTORNEYS

UNITED STATES PATENT OFFICE.

ELIJAH REA BELVEL, OF MINNEAPOLIS, MINNESOTA, ASSIGNOR TO THE HILL PUMP VALVE COMPANY, OF CHICAGO, ILLINOIS, A CORPORATION OF ILLINOIS.

TRUCK ATTACHMENT FOR AUTOMOBILES.

1,279,635.  Specification of Letters Patent.  Patented Sept. 24, 1918.

Application filed February 23, 1917. Serial No. 150,400.

*To all whom it may concern:*

Be it known that I, ELIJAH REA BELVEL, a citizen of the United States, resident of Minneapolis, county of Hennepin, State of Minnesota, have invented certain new and useful Improvements in Truck Attachments for Automobiles, of which the following is a specification.

The object of this invention is to provide an attachment by means of which an automobile of the "Ford" type can be easily and quickly converted from a pleasure vehicle into a truck or delivery car.

A further object is to provide an attachment of such a nature that comparatively little change is necessary to adapt it for the above type of runabout car; that is, no expensive alterations are necessary to embody my attachment in the car.

A further object is to provide a truck or delivery attachment which, when not in use, will be entirely concealed and the car will have every external appearance of a pleasure vehicle.

A further object is to provide a truck attachment in which provision is made to prevent the finished body of the car, such as the seat back, from being scratched or dented by contact with the articles which may be placed in the delivery box.

Other objects of the invention will appear from the following detailed description.

The invention consists generally in various constructions and combinations, all as hereinafter described and particularly pointed out in the claims.

In the accompanying drawings forming part of this specification,

Figure 1 is a detailed view of the rear portion of a runabout car of the Ford type, with my invention applied thereto.

Fig. 2 is a plan sectional view of the same, taken on line 2—2 of Fig. 1.

Figure 4:
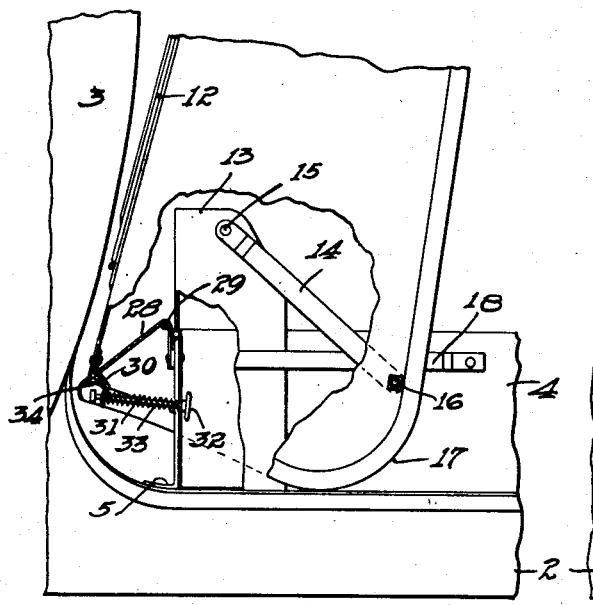
Figure 3:
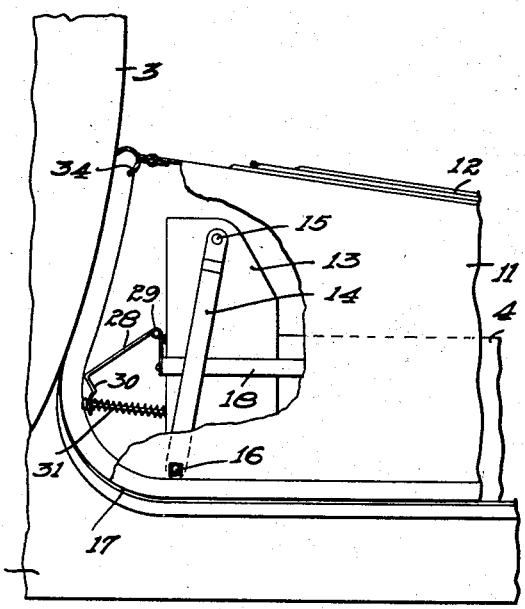
Figure 5:
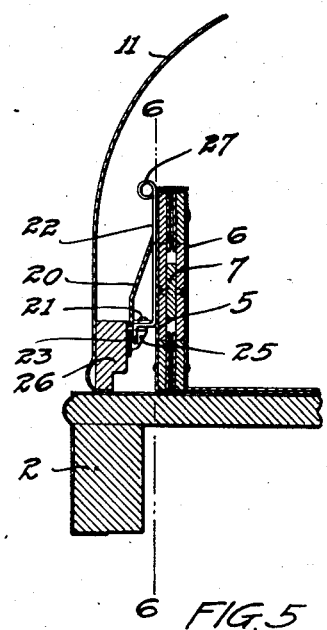
Figure 6:
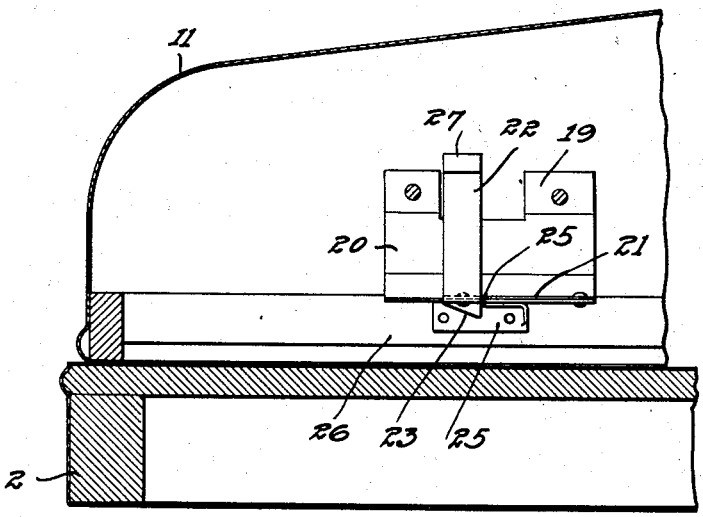

Fig. 3 is a detail view, showing the receptacle at the rear of the car in its normal horizontal position, Fig. 4 is a similar view, showing this receptacle having the function of a cover and in its raised position, Fig. 5 is a detail sectional view, showing the manner of mounting the sections of the truck and body or box thereon, Fig. 6 is a detail view of the means for locking the cover of the delivery or truck box in its horizontal position, taken on line 6—6 of Fig. 5, Fig. 7 is a detail sectional view, showing the manner of fastening the end gate or door of the telescoping delivery box.

In the drawing, 2 represents the platform at the rear end of the chassis of a car of the runabout type, such as the Ford. 3 is the rear portion of the seat. 4 is a stationary section of the delivery box, having ears 5 for securing it to the platform 2. Bolts 5' are also provided for rigidly securing the box 4 to the platform. 6 is a section which telescopes with the section 4 and for the purpose of increasing the effective length of the delivery box sliding bars 7 are provided on each side of the delivery box, having guides in the stationary and movable sections and on which bars the section 6 is moved back and forth to open or close the box. The rear end of the section 6 has a door or gate 8 hinged at 9 and normally locked by spring straps 10. The section 6 is also provided with a rigid cross bar 8' which prevents the bottom of the section from bending or buckling under the weight of the load. When the section 6 is pulled out, a comparatively long delivery box will be formed wherein many packages or articles may be placed for delivery or transportation from place to place. 11 represents the receptacle or container that is usually mounted in the rear of the seat of a runabout car of the Ford type. This box is equipped with a suitable bottom and has a hinged door 12 in the top, closing an opening through which access may be had to the interior of the box for placing articles therein or removing them therefrom. As generally used, this box forms a receptacle for spare tires, robes or wraps for the occupants of the car.

In carrying out my invention, I utilize this box as found on the car, but remove the bottom thereof so that it becomes a cover and arrange the stationary section 4 of the delivery box so that when the receptacle 11 is in its horizontal position, it will conceal the delivery box and form a cover therefor. For the purpose of mounting the cover, I provide on the forward end of the section 4 upright plates 13 and bars 14 are pivotally connected at 15 to the upper ends of these plates, while the lower ends of the bars are pivoted at 16 to the lower side walls of the receptacle near the forward end thereof.

The lower edges of the side walls of the cover 11 are curved at their forward ends, as indicated at 17, and are adapted to bear on the outer portions of the platform 2 when the part 11 (which, having its bottom removed, I will hereinafter refer to as a cover for the delivery box) is rocked to raise it to the position shown in Fig. 1 and expose the delivery box, or is swung down to its closing position, as shown in Fig. 3. In raising the cover, it is drawn backward, swinging the bars 14 past the center of their pivots on the plates 13, the curved edges of the side walls of the cover riding on the platform 2 and turning thereon as the cover is lifted. During this movement the bars 14 are guided by the horizontal straps 18 which are secured to the side walls of the stationary section of the delivery box. Upon the side walls of the stationary section 4 plates 19 are secured, having outwardly diverging portions 20. Springs 21 are mounted on said plates in position to engage locking latches 22, which are slidable vertically on said plates, and have beveled lower ends 23 to enter notches 24 in catch plates 25 which are secured to the rails 26 on each side of the cover walls at the lower edges thereof. When these parts are in the position shown in Fig. 6, the cover will be locked and cannot be raised to expose the delivery box until the latches 22 are lifted and disengaged from the catch plates 25. When this has been done, these plates with the cover may be moved backwardly to swing the bars 14 and allow the cover to tilt to a substantially upright position, as shown in Figs. 1 and 4.

The latches 22 have suitable finger grips 27 thereon and are accessible through the door in the top of the cover. Until this door is opened and the latches released, the cover will be locked and the telescoping sections of the delivery box concealed thereby.

On the forward wall of the stationary section of the delivery box I provide a plate 28 hinged at 29 and provided with an offset 30 opposite its hinged edge. A rod 31 is connected with said offset and is slidable in the forward wall of the stationary section of the delivery box and provided with a finger grip 32. A spring 33 is coiled on said rod and normally resists downward movement of the plate 28. The forward edge of the top of the cover has a forked portion 34 formed thereon, one arm of which engages the offset 30 when the cover is raised with sufficient pressure to hold the cover in its raised position, as indicated in Fig. 4, the plate 28 sliding on the rod 31 against the tension of the spring 33. This part 34 is the flanged edge of the sheet metal cover that is found on the device, which I make use of as a cover in this type of car, and hence no change is necessary to adapt it as a means for engaging the part 28 and holding the cover in its raised or tilted position. By having the cover at the front of the delivery box I not only provide for unobstructed, convenient access to the rear of the box for placing articles therein, or removing them, but also utilize the cover as a means to protect the rear of the seat from becoming scratched or dented by contact with articles which may be packed in the delivery box, and furthermore, I am able to adjust the telescoping section to any desired position, according to the mount of the load, that is, either fully or partially drawn out, as occasion may require. The door in the top of the cover may be locked by suitable means, so that access cannot be had to the latches within the cover until the door is released. The cover is securely clamped by the latches 22 against the platform of the car, so that all lateral motion or rattling of the cover is prevented. When tilted or raised to its upright position, I prefer to provide buttons 35, of rubber or other suitable material, to form stops for the cover and prevent it from coming directly in contact with the back of the seat.

I claim as my invention:

1. The combination, with an automobile body having a seat back and a platform in the rear of said seat, of a delivery box mounted on said platform and a cover therefor having side walls and a top and mounted for swinging upwardly and forwardly to expose said box or backwardly and downwardly to conceal the same, said cover, when raised having a portion thereof to lie between the front of the delivery box and seat back for protecting said seat back and providing an unobstructed rear end for said box.

2. The combination, with an automobile body having a seat thereon and a platform in the rear of said seat, of a delivery box mounted on said platform, a cover therefor hinged at its forward end and when in its horizontal position fitting said seat back, said cover being mounted for an initial backward movement to clear said seat back and a subsequent upward tilting movement on its hinges to expose said box.

3. The combination, with a vehicle frame having a platform and a seat mounted thereon, of a delivery box mounted on said platform, a cover therefor having a top and side walls to rest upon said platform and a forward end that is fitted to the back of said seat, pivots provided for said cover near the forward end thereof and mounted to allow an upward tilting movement to expose said box, and a locking means for said cover when closed accessible through the top thereof.

4. The combination, with a vehicle frame having a platform and a seat mounted thereon, of a delivery box mounted on said platform, a cover therefor having a top and side walls, pivots provided for said cover near the forward end thereof and locking latches mounted on said box to allow an initial backward movement of said cover to clear said seat back, and a final upward tilting movement to expose said box.

5. The combination, with a vehicle frame and a platform thereof, of a delivery box mounted on said platform, a cover therefor comprising a top and side walls, bars pivotally connected with said box above the middle portion of said cover and with the lower forward side walls of said cover and on which bars said cover is moved backwardly and then swung from a horizontal to an upright position.

6. The combination, with a vehicle frame and a platform thereon, of a delivery box composed of telescoping sections, a cover therefor having a top and side and end walls fitting over said box with the lower edges of its walls resting upon said platform, a seat mounted on said platform adjacent the forward end of said cover, bars having a pivotal connection at their upper ends with fixed supports and pivotally connected at their lower ends to the forward side walls of said cover, the pivots of the lower ends of said bars when the cover is in its closed position being in advance of the pivots of their upper ends, initial backward movement of said cover swinging the lower ends of said bars past the pivotal centers of their upper ends to clear said seat, and upward movement of said cover tilting it on the lower forward edges thereof to expose said box.

7. The combination, with a vehicle having a seat, of a delivery box mounted in the rear of said seat, a cover having a top and walls for normally concealing said box, said cover being pivoted near its forward end for tilting upwardly and forwardly to expose said delivery box and have a portion to lie between the front of the box and seat to protect said seat, said cover being mounted for an initial backward movement to clear said seat.

8. The combination, with a vehicle body and a seat thereon, of an extensible receptacle mounted in the rear of said seat, a cover or hood for normally concealing said receptacle, said hood having an upward and forward movement to protect said seat and expose the unobstructed rear portion of said receptacle and permit it to be closed or partially or wholly extended.

In witness whereof, I have hereunto set my hand this 17" day of February 1917.

ELIJAH REA BELVEL.